United States Patent
Hung et al.

(10) Patent No.: US 10,152,482 B2
(45) Date of Patent: Dec. 11, 2018

(54) METHOD OF SPEEDING UP ACCESS TO DESIGN DATABASES HAVING LARGE NUMBERS OF DESIGN UNITS

(75) Inventors: Yao-Jih Hung, Hsinchu County (TW); Robert Cameron Doig, Sedona, AZ (US); Yung Le Wang, Hsinchu (TW); Wei-Cheng Chen, Hsinchu County (TW); Jen-Feng Huang, Hsinchu County (TW)

(73) Assignee: SYNOPSYS, INC., Mountain View, CA (US)

( * ) Notice: Subject to any disclaimer, the term of this patent is extended or adjusted under 35 U.S.C. 154(b) by 0 days.

(21) Appl. No.: 13/449,334

(22) Filed: Apr. 18, 2012

(65) Prior Publication Data

US 2013/0091098 A1    Apr. 11, 2013

Related U.S. Application Data

(60) Provisional application No. 61/544,285, filed on Oct. 7, 2011.

(51) Int. Cl.
*G06F 17/30* (2006.01)

(52) U.S. Cl.
CPC .............. *G06F 17/30091* (2013.01)

(58) Field of Classification Search
CPC .............................. G06F 17/30091
USPC .......................................... 707/661
See application file for complete search history.

(56) References Cited

U.S. PATENT DOCUMENTS

| | | | | |
|---|---|---|---|---|
| 5,907,703 | A * | 5/1999 | Kronenberg et al. | 719/321 |
| 6,634,008 | B1 * | 10/2003 | Dole | 716/55 |
| 9,020,992 | B1 * | 4/2015 | Gunda | G06F 12/0815 |
| | | | | 707/827 |
| 2003/0200519 | A1 * | 10/2003 | Argyres | 716/6 |
| 2006/0010154 | A1 * | 1/2006 | Prahlad et al. | 707/102 |
| 2008/0229037 | A1 * | 9/2008 | Bunte et al. | 711/162 |

* cited by examiner

*Primary Examiner* — Etienne P Leroux
*Assistant Examiner* — Dara J Glasser
(74) *Attorney, Agent, or Firm* — Alston & Bird LLP

(57) ABSTRACT

A computer-implemented method is disclosed for speeding up database access of electronic design automation (EDA) tool which utilizes a database manager for file access. The EDA tool accesses a plurality of design files, and each of the plurality of design files is associated with one of a plurality of design units for an integrated circuit (IC). The plurality of design files are encapsulated into an archive file which comprises a plurality of data units, wherein each of the data units corresponds to a design file. A request to access a design file will be redirected to access the archive file. The design file is then accessed by accessing the corresponding data unit in the archive file.

12 Claims, 9 Drawing Sheets ated by an existing database manager;

METHOD OF SPEEDING UP ACCESS TO DESIGN DATABASES HAVING LARGE NUMBERS OF DESIGN UNITS

CROSS REFERENCE TO RELATED APPLICATIONS

This application claims the benefit of priority of U.S. Provisional Application No. 61/544,285, filed Oct. 7, 2011, and titled "Method of Speeding up Access to Design Database Having Large Numbers of Design Units", the contents of which are herein incorporated by reference in its entirety.

BACKGROUND OF THE INVENTION

1. Field of the Invention

The invention relates in general to a method for file accessing, and more particular to a method for speeding up file accessing to design databases for integrated circuits (ICs).

2. Description of the Prior Art

Design databases for electronic design automation (EDA) tools typically store design units on a file basis, that is, one design unit takes one disk file to store. Furthermore, there is some kind of correlation between a design unit name and its corresponding disk file name. There are some immediate advantages using this scheme.

For example, users can use operating system's (OS's) shell commands, such as "ls" on UNIX, to see the design files underneath a design library and to get a feel for how many design units there are, what their names are, etc. Also, using this scheme, the design database manager can take advantage of the services that the OS's file system offers, for example, file locking and file renaming.

Performance-wise, this scheme is normally acceptable because even though modern day's IC designs can be very large, the number of distinct design units is normally manageable. Taking OpenAccess, an industrial standard of electronic design database from Silicon Integration Initiative (Si2) organization, as an example, there are two kinds of storage schemes offered by OpenAccess, namely DMFileSys and DMTurbo; and both of them use the same one-design-unit-in-one-disk-file scheme.

However, during the last stage of integrated circuit (IC) design process as well as in the early stage of IC manufacturing process, there may be a need to "uniqueify" a design. This is the step in which a distinct design unit is created for each and every design unit instance. This can result in a huge number of design units in a design library, say, in the range of hundreds of thousands or more.

Please refer to FIG. 1A which shows an example of directory tree used by OpenAccess DMFileSys data manager to implement a design library. A design unit in OpenAccess is called a cellview. Each cellview, in DMFileSys mode, takes at least two levels of sub-directories and two files therein to implement. The first-level sub-directory is right underneath the root directory of the library, and the name of the sub-directory follows the cell name part of the cellview. Right underneath the cell sub-directory is a second-level sub-directory for the view name part of the cellview. The view sub-directory includes two files: master.tag and layout.oa. The master.tag is a text file that describes the name of the primary database file in the sub-directory; the layout.oa is the layout view for the design unit. In DMFileSys, therefore, if there are N cellviews in a design library, it will take 2N directories and 2N files to implement.

Please further refer to FIG. 1B which demonstrates another example of directory tree structure in OpenAccess used by a data manager called DMTurbo. In DMTurbo, there is an XML file, called lib.xml, in the library directory. For each cellview in the design library, a separate disk file is created in the library directory for the cellview. The mapping of a cellview name to its corresponding file name is described in lib.xml. As a result, in DMTurbo, if there are N cellviews in a design library, there will be (N+1) files in the library directory—the number of directories and files on the disk is substantially smaller than that of DMFileSys, but which still incurs large amounts of overhead when the number of cellviews is large.

The one-file-per-design-unit scheme will therefore create a huge number of files on disk in a design database. Consequently, performance of EDA tools will come to a halt when they have to access these kinds of databases.

Therefore, what is needed is an efficient data access scheme without using a large number of files or directories in order to speed up data access.

SUMMARY OF THE INVENTION

One object of the present invention is to speed up database access of the electronic design automation (EDA) tool. The EDA tool accesses a plurality of design files, and each of the plurality of design files is associated with one of a plurality of design units for an integrated circuit (IC).

In one embodiment of the present invention, the plurality of design files are encapsulated into an archive file, that is, the archive file comprises a plurality of data units, wherein each of the data units corresponds to a design file. A request to read a design file will be redirected to read the corresponding data unit in the archive file.

In one embodiment of the present invention, a fast storage is introduced to further speed up file access. When requesting to access the design file, the corresponding data unit for the design file is first extracted from the archive file to the fast storage. Then the design file is returned from the fast storage.

In one embodiment of the present invention, a request to save an updated design file will be redirected to update the corresponding data unit in the archive file.

With the number of disk files dramatically reduced, it eliminates the bottleneck of using a huge number of design files for accessing design data.

Other objects, technical contents, features and advantages of the present invention will become apparent from the following description taken in conjunction with the accompanying drawings wherein are set forth, by way of illustration and example, certain embodiments of the present invention.

BRIEF DESCRIPTION OF THE DRAWINGS

The foregoing aspects and many of the accompanying advantages of this invention will become more readily appreciated as the same becomes better understood by reference to the following detailed description, when taken in conjunction with the accompanying drawings, wherein.

DETAILED DESCRIPTION OF THE INVENTION

The detailed explanation of the present invention is described as following. The described preferred embodiments are presented for purposes of illustrations and description, and they are not intended to limit the scope of the present invention.

In this invention, an "archive" concept is introduced for improving the performance of existing electronic design automation (EDA) tools that need to access a huge number of design files on disks.

Figure 2A:
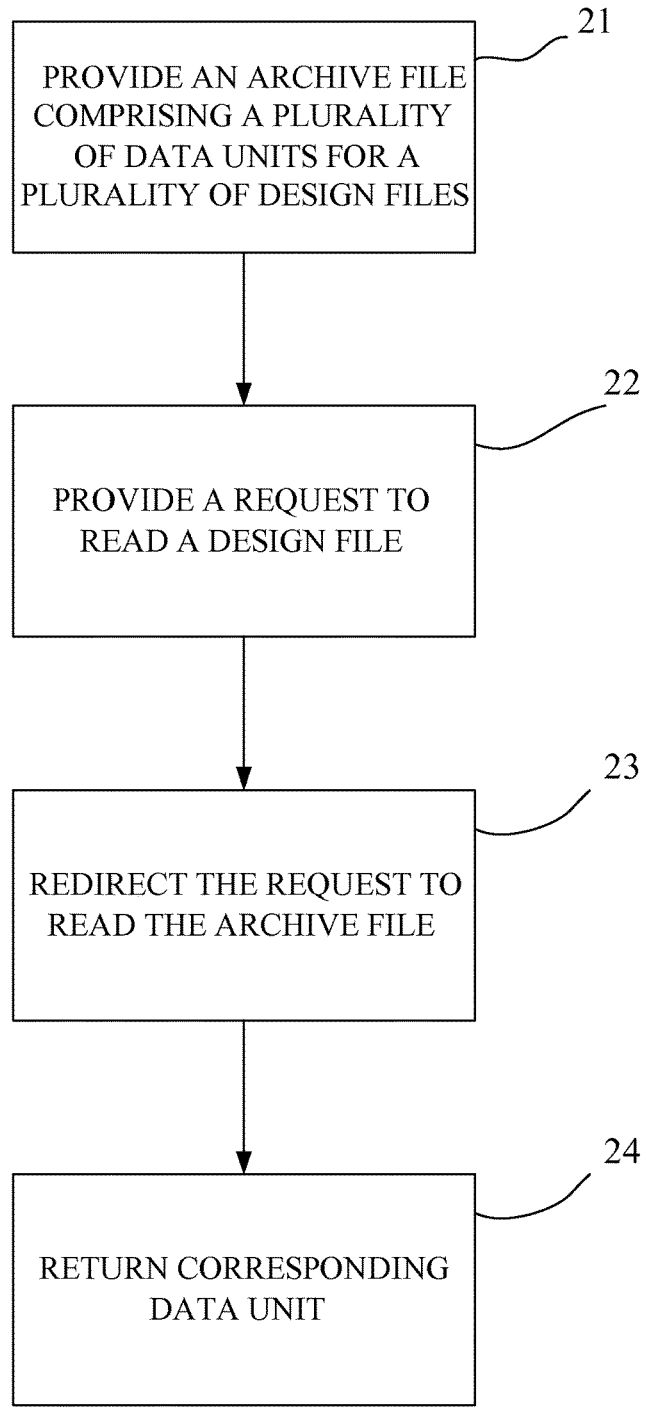
FIG. 2A and FIG. 2B are schematic flow diagrams for handling a design file read request in accordance with current invention.

Please refer to FIG. 2A which shows a schematic flow diagram in one embodiment of the invention. First, the design files for an integrated circuit (IC) design are encapsulated into an archive file In other words, the archive file comprises a plurality of data units, wherein each of the plurality of data units corresponds to a design file (step 21). Next, in an EDA tool, a request is provided to read a design file (step 22). Then, the request is redirected to read the archive file (step 23). Thus, the corresponding data unit for the design file can be returned (step 24). Since the size of a data unit can be variable, an index table can be used to indicate the size and location of the corresponding data unit in the archive file.

Figure 2B:
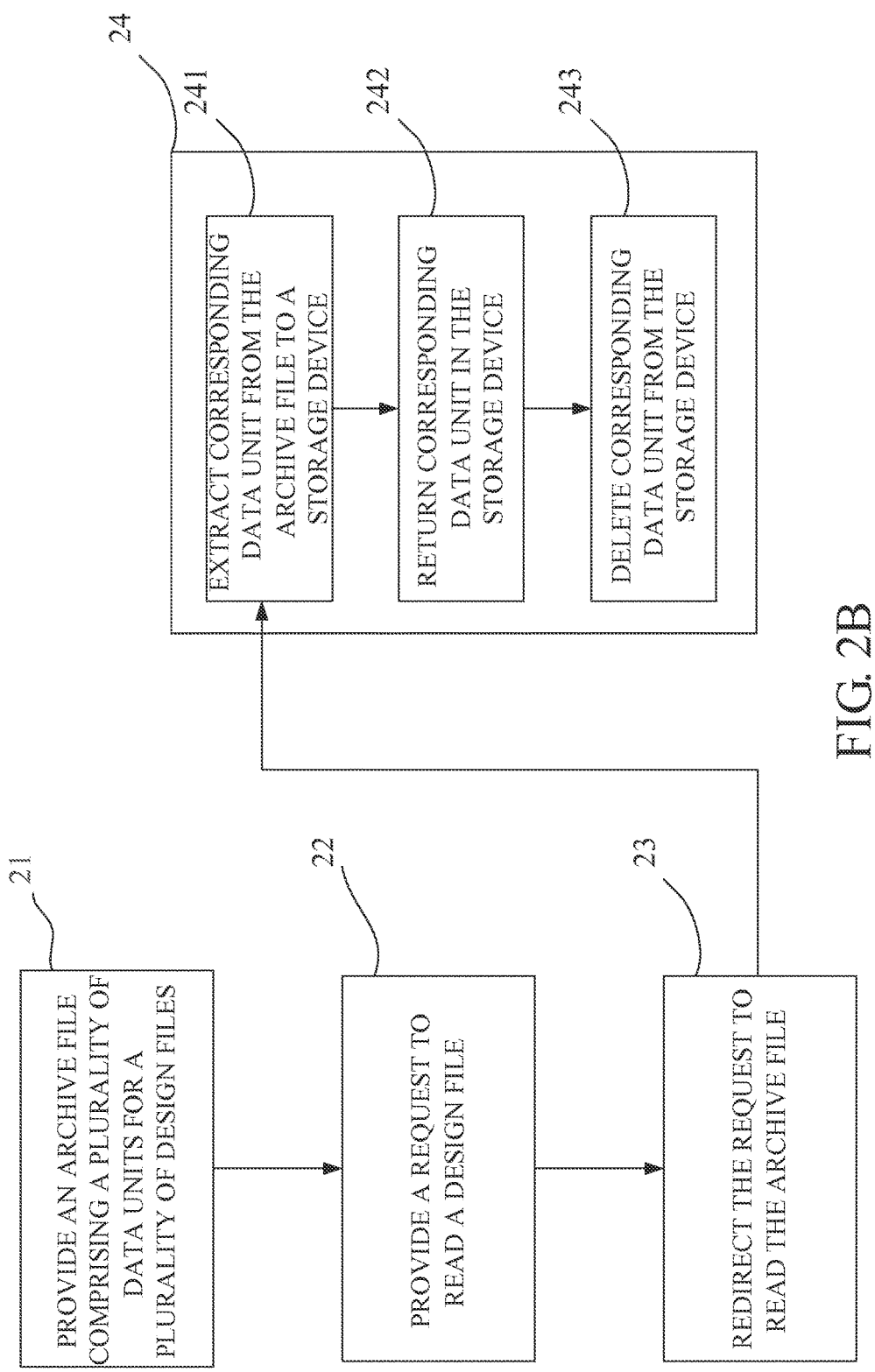

In one embodiment, step 24 further comprises three sub-steps as illustrated in FIG. 2B. First, the corresponding data unit is extracted from the archive file to a storage device (step 241). In one embodiment, the storage device can be a hard disk or a fast storage including a random access memory (RAM) disk or a solid state drive (SSD) for speeding up the file access.

Next, the corresponding data unit in the storage device can be returned for the design file (step 242). At last, in order to simplify successive access for design files, the current data unit is deleted from the storage device after being returned (step 243).

Figure 3A:
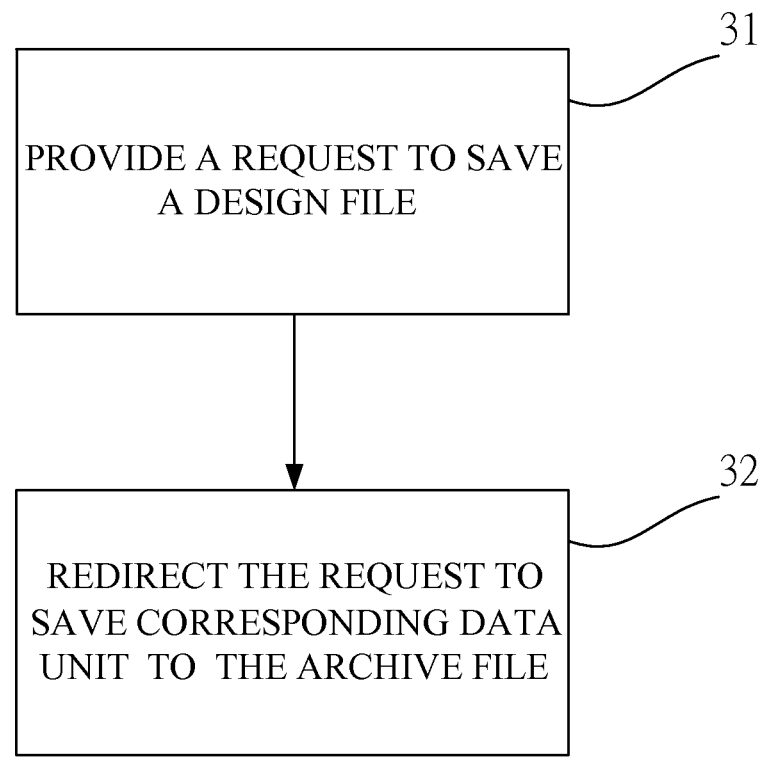
FIG. 3A and FIG. 3B are schematic flow diagrams for handling a design file save request in accordance with current invention.

In addition, a design file may be updated and need to be saved back to the archive files. Please refer to FIG. 3A which illustrates the corresponding schematic flow diagram. First, a request is provided to save the design file (step 31), and then the request is redirected to save the corresponding data unit for the design file into the archive file (step 32). In one embodiment, the corresponding data unit size information in an index table is updated due to the changes of design file. Furthermore, the corresponding location information in the index table is also updated if the original location and space cannot fit the updated data unit.

Figure 3B:
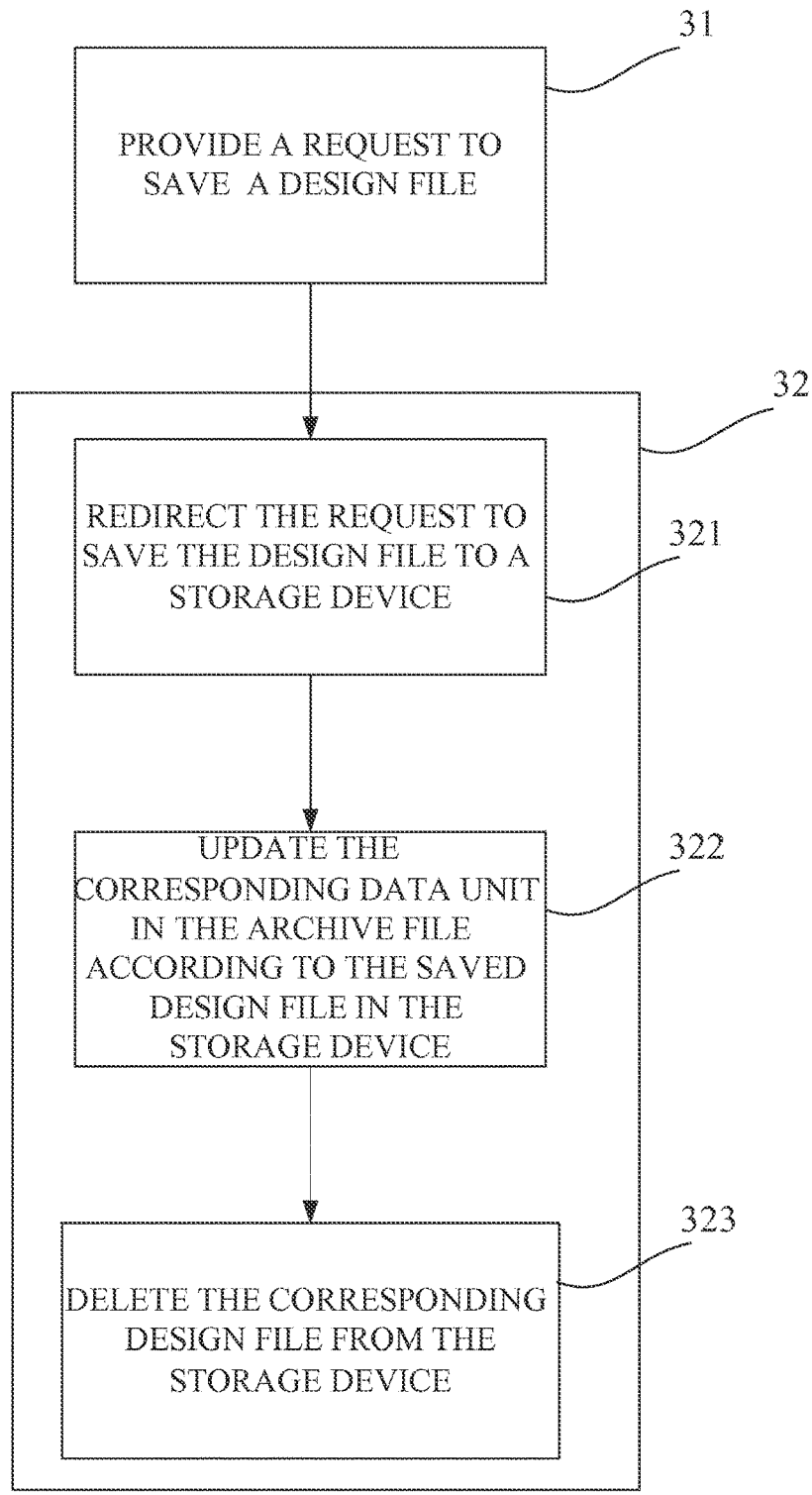

In one embodiment, referring to FIG. 3B, step 32 further comprises three sub-steps. First, the request is redirected so that the design file is saved into a storage device (step 321). In one embodiment, the storage device can be a hard disk or a fast storage including a random access memory (RAM) disk or a solid state drive (SSD) for speeding up the file access.

Next, the design file in the storage device is saved into the archive file as a data unit (step 322). At last, in order to simplify successive access for design files, in one embodiment, the current design file is deleted from the storage device after being saved (step 323).

In one embodiment, the design files for the integrated circuit (IC) design can be encapsulated into more than one archive file, wherein the number of archive files is dramatically smaller than the number of design files. Moreover, in one embodiment, a single design file can be split into multiple archive files. In this case, a data unit of an archive file may refer to only a portion of the single design file. Thus, when accessing the single design file, all corresponding data units in the multiple archive files should be retrieved and collected together.

Figure 4A:
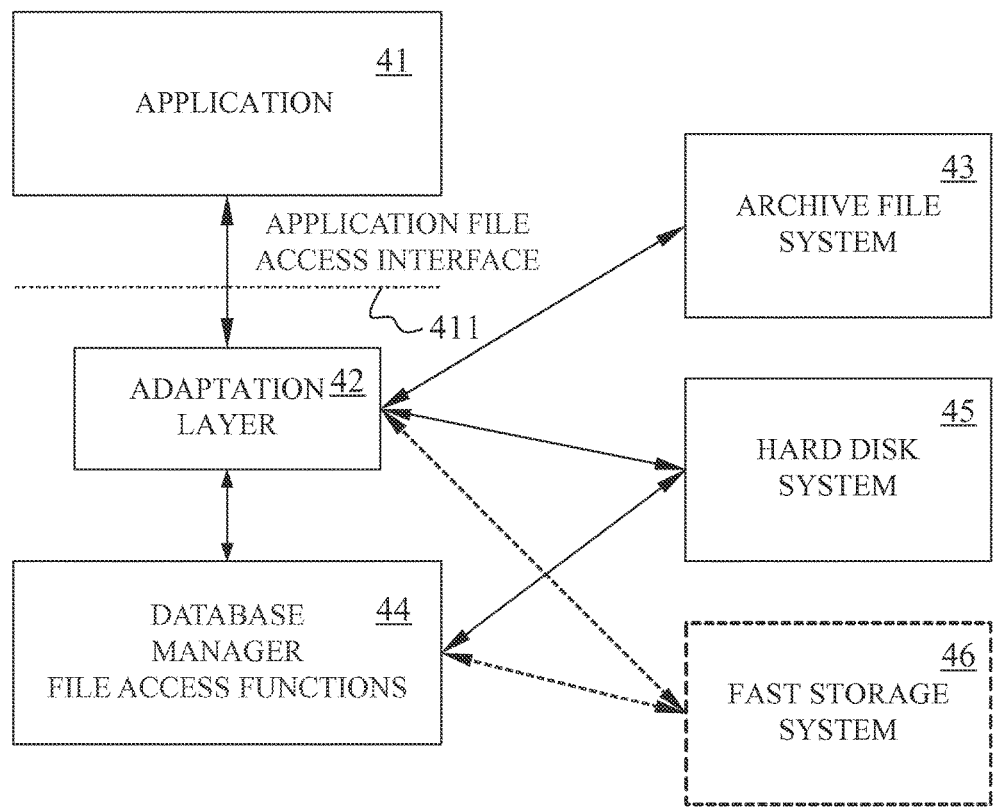
FIG. 4A and FIG. 4B are schematic block diagrams depicting two embodiments of the software architecture in accordance with current invention.

Furthermore, please refer to FIG. 4A which depicts one embodiment of the invention in view of software architecture. Block 41 represents the EDA tool application which provides requests to access design files through application file access interface (dash line 411) provided by an existing database manager. Block 44 is the file access functions of database manager for accessing design files from a storage device. Block 43 is an archive file system which stores the archive file. Block 42 is an adaptation layer which contains functions wrapping the file access activities underneath. Block 45 is a storage device such as hard disk system which can be accessed by the database manager through the file access functions of the database manager (block 44).

When a read request for a design file is provided through the application file access interface (411), the request is redirected to the corresponding wrapper functions in block 42 to locate corresponding data unit in the archive file for the design file and extract the corresponding data unit to the hard disk system (block 45). Thus the file access functions of database manager (block 44) can read the corresponding data unit from the hard disk system (block 45). After that, the corresponding wrapper functions in block 42 will delete the data unit in the hard disk system (block 45).

On the other hand, when a write (save) request for a design file is provided through the application file access interface (411), the request is redirected to the corresponding wrapper functions in block 42 to call the file access functions of database manager (block 44) to update the design file by saving the design file into the hard disk system (block 45). After that, the corresponding wrapper functions in block 42 will update the corresponding data unit in the archive file according to the design file in the hard disk system (block 45) and then delete the design file in the hard disk system (block 45) after the design file is saved in the archive file. In one embodiment, a fast storage system (block 46) instead of the hard disk system (block 45) is used to further speed up the file access. In one embodiment, the hard disk system (block 45) and the fast storage system (block 46) can exist at the same time.

Figure 4B:
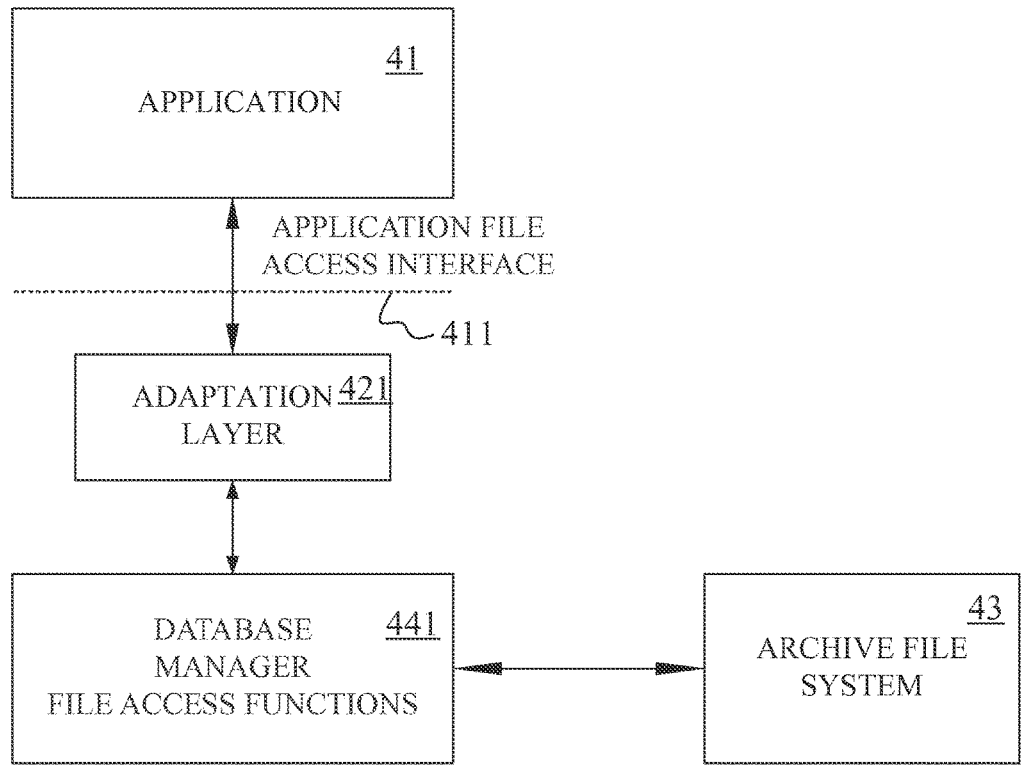

In one embodiment, referring to FIG. 4B, if the file access functions of database manager (block 441) can access the corresponding design unit from an external file (i.e., the archive file in block 43) according to an index information, then the corresponding data unit can be returned to the application through the adaptation layer (block 421) which provides the application file access interface (411) and wraps the archive file access activities underneath, without the assistance of storage devices (block 45 or block 46). Therefore, the storage devices (block 45 or block 46) are not needed in this case.

To sum up, by encapsulating the extra work needed to support the archive file accessing in the functions in the adaptation layer, the changes made to the underneath file structure will be transparent to application programs as well as existing database managers. In other words, the execution performance can be improved without changing the application programs or the database managers for maintaining the same behavior from user's perspective.

Figure 5A:
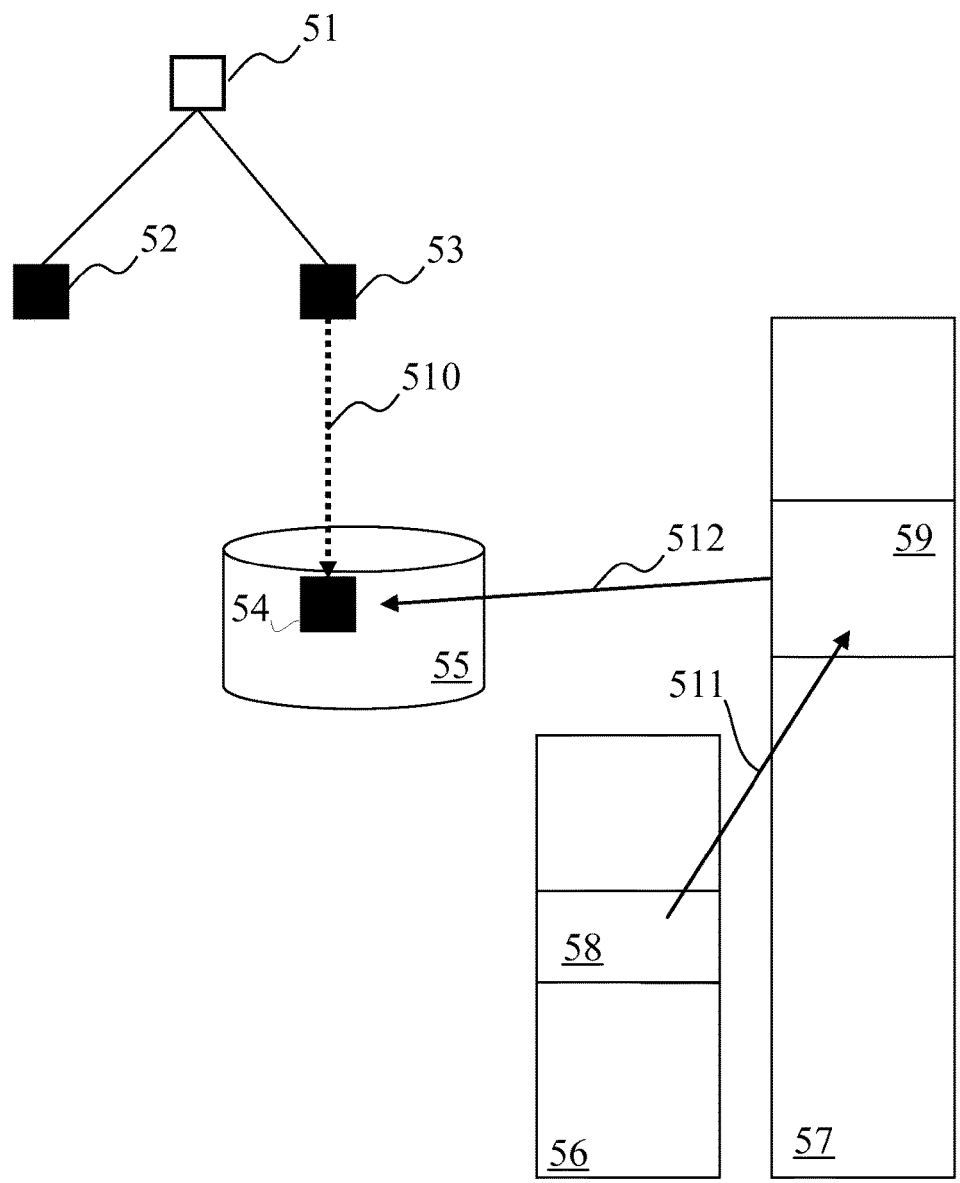
FIG. 5A illustrates an example of disk file structure and data reading flow applied on an existing database manager in accordance with current invention.

FIG. 5A provides an example to explain how the current invention is applied on OpenAccess database manager with DMTurbo mode.

Initially a request to read a cellview is provided. Next, according to the invention, the request is redirected to the wrapper functions as described above. Then the corresponding cellview 59 is extracted from an archive file 57 to a fast storage 55 as file 54 (as path 512 indicates) by looking up corresponding entry 58 in an index table file 56 to identify the location of cellview 59 (as path 511 indicates).

Figure 1A:
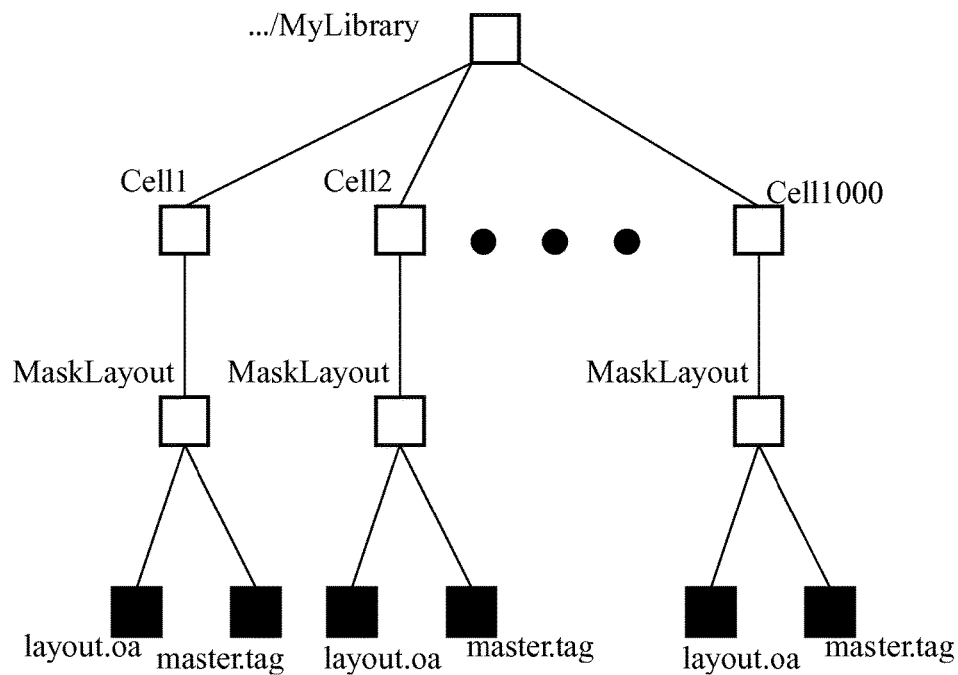
FIG. 1A and FIG. 1B are examples showing the directory trees created by an existing database manager.
Figure 1B:
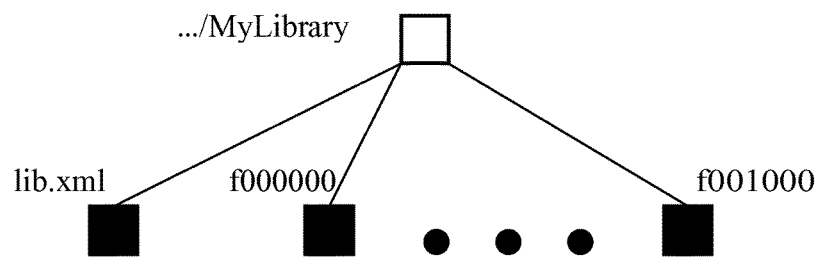

As illustrated in FIG. 1B, lib.xml file 52 under the root directory 51 is originally used for the database manager to map a cellview name to its corresponding cellview file. However, in order to force the database manager to access the fast storage 55, the lib.xml file 52 is modified to map every cellview to a dummy file f000000 (53) which is a symbolic link to the cellview file 54 in the fast storage 55 as indicated by dash line 510. Then, the database manager proceeds in its normal way of accessing the cellview file 54 through the symbolic link. After that, the file 54 in the fast storage 55 is deleted so that the fast storage 55 is ready for the next request.

Although the index table file 56 shown in FIG. 5A is separated from the archive file 57, it is possible to store the index table in the archive file 57.

Figure 5B:
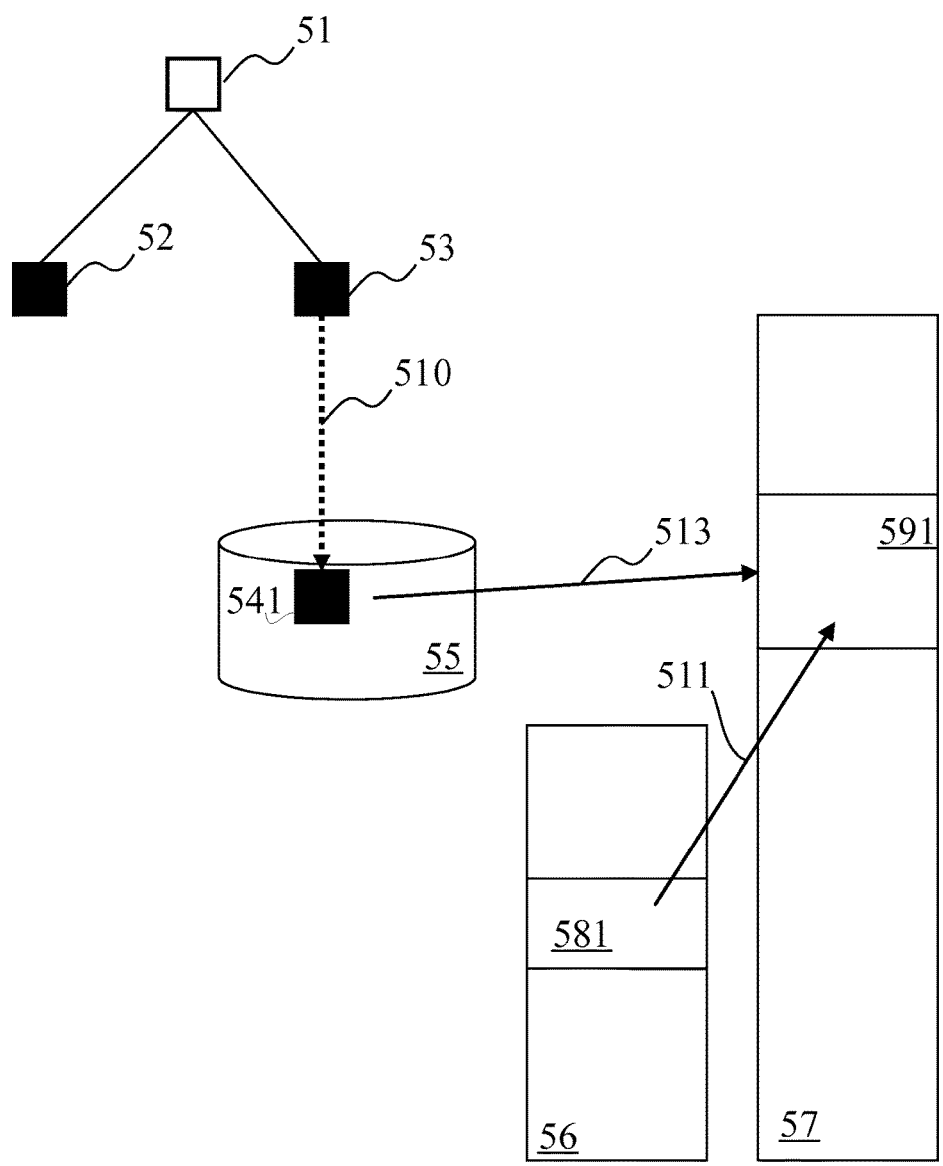
FIG. 5B illustrates an example of disk file structure and data saving flow applied on an existing database manager in accordance with current invention.

For a scenario of updating an existing cellview, please refer to FIG. 5B. As described above, since every cellview is mapped to the dummy cellview file f000000 (53), which is symbolically linked to the fast storage 55, the database manager will write the updated cellview to the fast storage 55 as file 541. The contents of file 541 are then copied from the fast storage 55 to the archive file 57 (as path 513 indicates) by looking up corresponding entry 581 in the index table file 56 to decide the location of cellview 591 (as path 511 indicates). After that, the file 541 in the fast storage 55 is deleted so that the fast storage 55 is ready for the next request.

The reason why the invention can greatly reduce the time needed for disk access is that the number of directories and the number of disk files are greatly reduced for the whole IC design. Unlike in the original DMTurbo mode where each cellview file has to be accessed separately, each cellview file is accessed through the archive files collectively as illustrated in FIG. 5A and FIG. 5B. Moreover, by using a fast storage, the performance of file access can be further improved.

As for preparing an archive file for a design, typically there are two ways: batch mode and incremental mode. In batch mode, a full design database is first created on disk. Then, a utility program moves all the design files from the design library to the archive files and creates corresponding index tables. It then deletes all the design files in the design library.

Alternatively, the preparation of the archive files and index tables can be done incrementally. Wrapper functions in block 44 as shown in FIG. 4 may be used in conjunction with the flow diagram demonstrated in FIG. 3B. Initially, the archive files and the index tables are empty. Each time a new design file is created and saved, the database manager will write it to the fast storage. Then, it is moved to an archive file and the corresponding index table is updated accordingly. The file in the fast storage is deleted so that the system is ready for the next design file creation.

Moreover, in one embodiment, data units for design files may be compressed in the archive files. Consequently, when reading data units from archive files, a decompression process becomes necessary. Data compression usually reduces the size of disk space needed to store design files. Time spent in central processing unit (CPU) for data compression or decompression is offset by the time saved in disk I/O due to reduced data size.

The foregoing descriptions of specific embodiments of the present invention have been presented for purposes of illustrations and description. They are not intended to be exclusive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to particular use contemplated. It is intended that the scope of the invention be defined by the Claims appended hereto and their equivalents.

What is claimed is:

1. A computer-implemented method for speeding up accesses by an EDA tool to integrated circuit design files from a design database for integrated circuits, the method comprising:
   in response to receiving, by a processor and from the EDA tool, a first request to access a first integrated circuit design file from among a plurality of integrated circuit design files associated with the integrated circuit, the plurality of integrated circuit design files stored in a storage device,
   redirecting, by the processor, the first request to read an archive file, the archive file comprising a plurality of data units wherein each data unit is representative of an integrated circuit design file of the plurality of integrated circuit design files stored in the storage device;
   extracting, by the processor and to the storage device, only a first data unit from the archive file, the first data unit corresponding to the first integrated circuit design file, wherein said extracting further includes providing a symbolic link to the first integrated circuit design file in the storage device;
   returning, by the processor and from the storage device, the first integrated circuit design file to the EDA tool; and
   deleting, by the processor, the extracted first data unit from the storage device.

2. The computer-implemented method according to claim 1, wherein an index table is used to specify the size and location for each of a plurality of data units in the archive file.

3. The computer-implemented method according to claim 1, wherein said storage device is a hard disk.

4. The computer-implemented method according to claim 1, wherein said storage device is a fast storage which includes a random access memory (RAM) disk or a solid state drive (SSD).

5. The computer-implemented method according to claim 1, wherein a first set of functions is added to redirect said first request.

6. The computer-implemented method according to claim 2, further comprising:
   receiving, from the EDA tool, a second request to update a second integrated circuit design file from the plurality of integrated circuit design files;
   redirecting said second request to the archive file to save a second data unit corresponding to the second integrated circuit design file into the archive file; and
   saving said second data unit in the archive file.

7. The computer-implemented method according to claim 6, wherein the index table is updated as a result of the size or location of said second data unit being changed.

8. The computer-implemented method according to claim 6, wherein saving the second data unit comprises:
   saving said second integrated circuit design file into a storage device; and
   updating the second data unit according to said second integrated circuit design file.

9. The computer-implemented method according to claim 8, wherein saving the second data unit further comprises:
   deleting said second integrated circuit design file unit from said storage device.

10. The computer-implemented method according to claim 8, wherein a second set of functions is added to redirect said second request.

11. The computer-implemented method according to claim 1, wherein the first data unit in the archive file is compressed, and wherein returning the extracted first data unit from the storage device comprises decompressing the first data unit.

12. A non-transitory computer readable medium storing one or more programs for speeding up accesses by an EDA tool to integrated circuit design files from a design database for integrated circuits, said one or more programs comprising instructions, which when executed by a computer, cause the computer to:
   in response to receiving, from the EDA tool, a request to access a first integrated circuit design file from among a plurality of integrated circuit design files associated with the integrated circuit, the plurality of integrated circuit design files stored in a storage device,
   redirect the request to read an archive file, the archive file comprising a plurality of data units wherein each data unit is representative of an integrated circuit design file of the plurality of integrated circuit design files stored in the storage device;
   extract, to the storage device, only a first data unit from the archive file, the first data unit corresponding to the first integrated circuit design file, wherein the extract includes a symbolic link to the first integrated circuit design file in the storage device;
   return, from the storage device, the first integrated circuit design file to the EDA tool; and
   delete the extracted first data unit from the storage device.

* * * * *